United States Patent Office 3,806,396
Patented Apr. 23, 1974

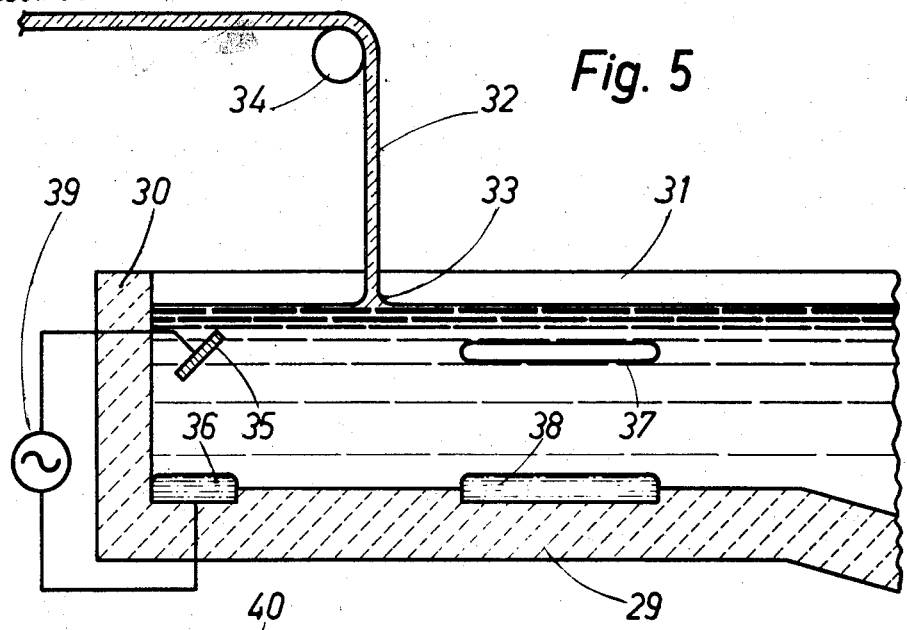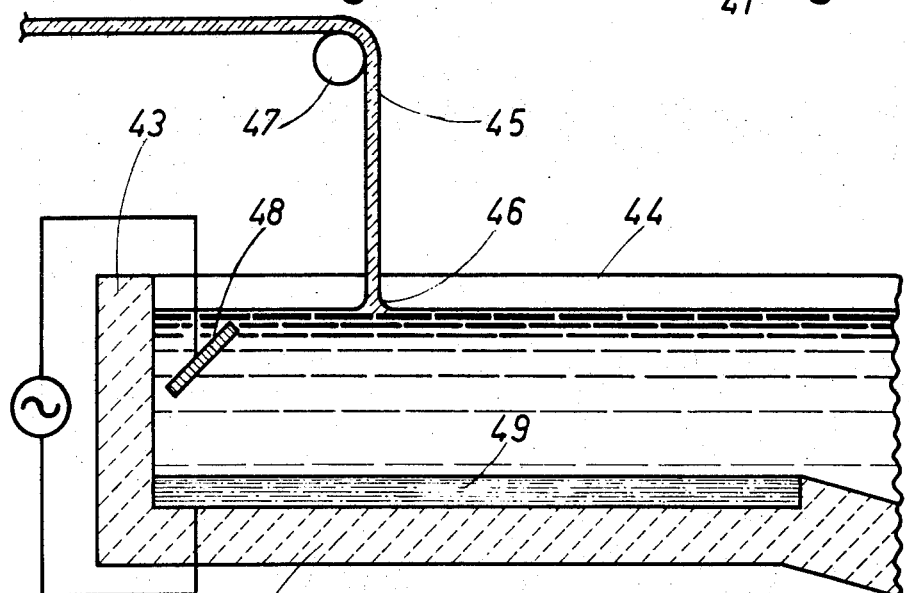

3,806,396
CONTROL OF FLOW OF GLASS TO A GLASS RIBBON BEING DRAWN
Edgard Brichard, Jumet, Emile Plumat, Gilly, Eloy Duchene, Loverval, and Robert Leclercq, Auvelais, Belgium, assignors to Glaverbel, Watermael-Boitsfort, Belgium
Filed Feb. 24, 1972, Ser. No. 228,902
Claims priority, application Luxembourg, Feb. 24, 1971, 62,647
Int. Cl. C03b 15/04
U.S. Cl. 161—1                                   39 Claims

ABSTRACT OF THE DISCLOSURE

In the fabrication of flat glass by drawing a ribbon of glass upwardly from the free surface of a molten glass bath, the uniformity of the glass currents feeding the ribbon is improved by passing an electric current through the glass in the bath between electrodes at different levels of the bath.

BACKGROUND OF THE INVENTION

The present invention relates to a process of manufacturing sheet glass by continuously feeding molten glass into a kiln to form a glass bath and continuously drawing a ribbon of glass upwardly from the surface of the glass bath in the kiln. The invention also relates to apparatus for use in carrying out such process.

In the performance of a glass drawing process as referred to above, the thermal and flow conditions in the kiln are of critical importance for the quality of the drawn glass. It is in all cases necessary for these conditions to be such that a substantially stable meniscus is established at the surface of the glass bath at the drawing zone, but the formation and maintenance of such a meniscus does not alone by any means ensure that the drawn glass will be of good quality.

Glass is drawn inwardly into the meniscus from surface regions of the molten glass surrounding the meniscus and the temperature differences which invariably exist between surface regions of the glass at different distances from boundary walls of the kiln, combined with the rather complex existing glass flow pattern, tend to prevent the formation of a ribbon which is truly flat and of substantially uniform thickness across its width, and also tend to lead to optical defects due to the mixing of currents of glass having different viscosities. These tendencies become more marked as the drawing speed increases.

The above problems arise in all drawing processes in which the ribbon of glass is drawn from the surface of the molten glass in the kiln, as distinct from processes, such as the classic Fourcault process, in which the molten glass is extruded into the ribbon from beneath the surface of the molten glass bath in the kiln. In such extrusion processes the flow pattern of the glass is quite different and the problems above referred to do not arise.

Broadly stated, the drawing processes with which the present invention is concerned can be divided into two categories according to the depth of the kiln at the drawing zone. In processes of one category, use is made of a shallow kiln, or pot, and glass is fed into the drawn glass ribbon from the full depth of the molten glass in the kiln. This category of process includes the classic Colburn process in which the glass ribbon drawn upexample, the glass ribbon can in any given type of process and is conveyed through a horizontal annealing lehr.

In the other category of processes, use is made of a deep kiln, or tank, in which the forward current of glass flowing to the drawing zone flows over a return current of colder glass coming from the terminal end region of the kiln. This category of process includes the classic Pittsburgh process in which the glass ribbon is drawn upwardly through a vertical drawing tower.

Numerous modifications of these classic processes are possible within the broad categories referred to. For example, the glass ribbon can in any given type of process be drawn from the kiln at an inclination to the vertical, and a ribbon drawn from a deep kiln can be bent around a bending roller instead of being drawn through a vertical drawing tower.

The demands for high quality glass and higher rates of production have stimulated a continuous search by manufacturers for ways of creating better thermal and flow conditions in the drawing plant and numerous proposals to this end have been made in recent years.

Thus, it has been proposed to externally heat bottom and side wall portions of the kiln to particularly high temperatures in order to reduce flow retardation along the walls. This expedient, however, does not produce conditions which are favorable to the production of high quality sheet glass. In fact there is an increased risk of the drawn glass becoming contaminated by grains of refractory material or being caused to contain gas bubbles. The tendency for the refractory material to be corroded or eroded increases as the temperature of the refractory material is raised.

SUMMARY OF THE INVENTION

It is an object of the present invention to promote the flow of glass into the ribbon from any given part of the kiln so as to reduce disparities in the composition and flow of glass currents feeding different parts of the ribbon.

Another object of the invention is to increase the rate of drawing without increasing the risk of refractory corrosion and erosion which this has hitherto entailed.

According to the present invention, there is provided in a process of manufacturing sheet glass by continuously feeding molten glass into a kiln to form a glass bath, and continuously drawing a ribbon of glass upwardly from the surface of the glass bath in the kiln, the improvement that the flow of molten glass into the ribbon from at least one part of the kiln is promoted, in order to improve the uniformity between the glass currents feeding different parts of the ribbon, by passing an electric current through molten glass in that part or parts of the kiln, between electrodes which are at different levels in the kiln.

The invention enables the flow of glass into the ribbon from any given part of the kiln to be promoted without externally applying heat to raise local regions of the kiln walls to exceptionally high temperatures, which would involve a substantial risk that the molten glass feeding the ribbon would become contaminated by grains of refractory material or gas bubbles, as previously discussed. The flow is promoted by passing electric current through molten glass in the kiln. The electrodes can be placed to influence the flow of glass in any part or parts of the kiln, whether adjacent a wall of the kiln or not.

When performing the process according to the invention, it has been found that there results an improvement in the stratification of the glass in the drawn ribbon.

The "stratification" of a drawn glass sheet identifies some features of its internal structure which is constituted by a series of thin strata of glass of different refractive index, due to the various temperatures existing in the different regions of the molten glass, as well as to residual differences in the chemical composition, and above all due to the very great number of elementary layers of molten glass which slide one against the other in a more or less laminar flow until they pass beyond the drawing meniscus. An ideal stratification is one in which the strata are perfectly flat and perfectly parallel to the major glass faces because this will result in glass having the best optical quality and particularly the smallest degree of optical distortion. Stratification is therefore improved when made to conform more clearly to the ideal.

A good stratification is known to have a favorable effect on the optical properties of the sheet glass. Consequently, this further result which the invention makes possible is of great practical importance.

It appears that the passage of electric current through the molten glass in the kiln has composite effects.

Firstly, the glass between the electrodes is heated so that its flow is promoted. The heat is produced by Joule effect within the mass of glass, molten glass having a certain electrical conductivity, and does not have to be transmitted through refractory wall of the kiln.

A second important factor influencing the glass flow is the location of the electrodes at different levels. If current is passed through the molten glass between electrodes at the same horizontal level, there is a tendency for turbulence to occur with consequent adverse effects on the smooth uniform flow of glass to the base of the drawn ribbon. On the contrary, the creation of a potential difference between electrodes situated at different horizontal levels in the kiln tends to stabilize the distribution of currents of glass and to keep them steady.

Preferably use is made of electrodes located so that the direction, or the mean direction, of the electric current is vertical or has a considerable vertical component. In particular it is preferred for such direction or mean direction to be at least 45° to the horizontal. In general, the more the current direction or the mean current direction approaches the vertical, the greater is the stabilizing effect on the glass currents and the more the electrical system promotes good stratification of glass in the ribbon.

According to a preferred embodiment, an electric current through the molten glass in at least one part of the kiln is established between at least one pair of electrodes located so that the shortest path between them is vertical or nearly vertical. This disposition of an electrode pair is optimum from the point of view of glass current stabilization.

Advantageously, particularly when performing a process in a shallow kiln, or pot, in which glass is drawn from the full depth of the molten glass in the kiln, an electric current is passed through the molten glass in at least one part of the kiln between at least one pair of electrodes located at different horizontal levels, one of the electrodes being located at or adjacent the bottom of the kiln. The location of one electrode at such a position promotes flow of molten glass along the bottom regions of the kiln and this has the desirable result of directly or indirectly promoting the flow of glass currents feeding the drawn glass ribbon.

According to a further preferred feature, particularly applicable in such a shallow kiln process, an electric current is passed through the molten glass in at least one part of the kiln between at least one pair of electrodes located at horizontal levels having a vertical spacing which is greater than half the depth of the molten glass in the part of the kiln in which such electrodes are located. If the depth of the kiln varies over that part thereof, the reference depth is the greatest depth within that part. Preferably the vertical spacing is at least three-quarters of the depth or maximum depth.

Optimally, there is a pair of such electrodes, one of which is located at or adjacent the bottom of the kiln and the other of which is located at or adjacent the surface level of the molten glass. The advantage of using a pair of electrodes which are vertically spaced an appreciable distance apart, as above referred to, is that it causes the electrical system to influence the flow of molten glass over an appreciable depth of the molten glass mass.

In the shallow bath process, as hereinbefore referred to, it is preferable for electric current to be passed through at least one part of the molten glass in the kiln between a pair of electrodes, the lower one of which forms part of or is located directly on the sole of the kiln. This placing of a lower electrode is useful for preventing the occurrence of a stagnant zone within the molten mass where grains of devitrified glass might be formed.

A lower electrode located at the bottom of the kiln as aforesaid may be solid. Alternatively such an electrode can be formed of a quantity of molten metal or molten metal salt on which the molten glass floats.

The floatation of at least part of the mass of molten glass on a layer of molten metal or molten metal salt itself contributes to promoting the flow of molten glass by reducing or avoiding frictional retardation of molten glass at the bottom of the kiln. This is more particularly of value in shallow bath processes in which the molten glass feeding the ribbon is drawn from the full depth of the molten glass in the kiln. It is of course possible to provide a layer of molten metal or molten metal salt at the bottom of the kiln for promoting the flow of glass, regardless of whether or not that molten metal or molten metal salt is to serve as one of the electrodes.

In certain very advantageous embodiments of the invention, the electric current is passed between electrodes located at or near the top and bottom levels, respectively, of a part of the kiln from which molten glass feeds the ribbon. In such processes, a layer of molten glass flowing into the ribbon is subjected to the influence of the electric current over the full depth of such layer.

In a shallow bath process, one electrode of a pair is located at or near the bottom of the kiln and the other electrode of such pair is located at or near the surface of the molten glass in the kiln in order to achieve this advantage. The invention can be applied in this way, for example, when using a classic Colburn type process.

In a deep bath process, in which the flow of molten glass into the ribbon is located in an upper part of the kiln, at least one pair of electrodes is used, of which the lower electrode is disposed at or near the lowest level of such flow. The invention can be applied in this way, for example, when using a classic Pittsburgh type process.

In certain embodiments of the invention, an electric current is maintained through molten glass located in a part of the kiln which in a plan view of the kiln is directly to the rear, i.e. downstream, of the drawing zone. The location of electrodes for maintaining an electric current in that part of the kiln promotes flow of molten glass into the rear side of the ribbon, i.e. the side facing away from the feed end of the kiln.

The disparity between the glass currents feeding the front and rear sides of the ribbon is often more responsible than any other factor for the limitation which has to be observed in the drawing speed if the drawn glass is to be of an acceptable quality. The passage of electric current between electrodes located at different horizontal levels and in a part of the molten glass which is to the rear of the drawing zone, as above referred to, can make it possible to increase the drawing speed without the ribbon becoming deformed or showing poor stratification.

Preferably the electric current is maintained between electrodes which, in a plan view of the kiln, are located directly rearwardly of the drawing zone as aforesaid, at least the upper one of these electrodes being spaced forwardly from the rear end of the kiln. In that case the flow of glass into the rear side of the ribbon is promoted without producing fast currents of glass against the rear end wall, which currents would be liable to entrain grains of devitrified material into the drawing zone.

It is also advantageous to establish an electric current through molten glass located adjacent a side wall of the kiln. By such means it is possible to reduce or avoid disparities between flow currents feeding, on the one hand, the central portion of the ribbon and, on the other hand, a margin of the ribbon, without increasing, and frequently while reducing, the corrosion or erosion of the side wall of the kiln. This result is best achieved by placing the electrodes so that, in a plan view of the kiln, they are in a region in the vicinity of an end of the meniscus via which glass enters an edge of the ribbon.

In the case where electric current is passed through molten glass located adjacent a side wall of the kiln, as above referred to, it is of course preferable for an electric current also to be passed through the molten glass adjacent the other side wall of the kiln so that similar flow conditions determine the formation of both edge portions of the ribbon.

One result of an improvement in the flow of molten glass into the marginal portions of the ribbon is that the width of the marginal portions of the ribbon which have to be discarded when the ribbon is cut is reduced.

The invention includes apparatus for use in drawing sheet glass and composed of a kiln having a feed end at which it can be continuously fed with molten glass, and means for continuously drawing a ribbon of glass upwardly from the surface of the glass in the kiln, and involves the improvement that there is means for passing an electric current through molten glass in at least one part of the kiln where molten glass currents flow towards a side margin or the rear side of the ribbon, these means being composed of a source of electric potential connected to at least one pair of electrodes located at different levels in the kiln.

With this apparatus it is possible to produce an appreciable amount of heat within the molten mass of glass in the kiln for promoting faster stabilized currents at one or more critical regions. In consequence the apparatus enables good quality sheet glass to be drawn at a faster rate than would normally be possible.

According to important embodiments of the invention, there is at least one pair of electrodes disposed at different horizontal levels in the kiln and disposed so that the direction or the mean direction of the electric current path between them is at an angle of more than 45° to the horizontal. In the most preferred embodiments, there is at least one pair of electrodes disposed at different horizontal levels in the kiln and disposed so that the shortest path between them is vertical or nearly vertical.

Advantageously at least one electrode is composed of molten metal. In that case, convection currents within the molten metal assist in maintaining a constant temperature at the surface of the electrode even if it is of substantial area.

Advantageously, the electrical system includes at least one electrode made from solid material. It is suitable for such solid electrode to be composed of a material taken from the group: refractory noble metals, graphite, molybdenum, and electrically conductive refractory oxides such as $SnO_2$. The material of which the electrode is made can if required contain a doping agent. These solid electrode materials behave well in contact with molten glass and can be used for the lower and/or upper electrode of an electrode pair. It is an advantage of a solid electrode that it can be of any shape selected to achieve a predetermined current density or distribution in the kiln at the site of the electrode.

According to a further advantageous feature, the electrical system includes at least one electrode which is composed of electrically conductive molten salt. Such an electrode, like a molten metal electrode, can be installed and replaced easily.

The electrical system of the apparatus preferably includes at least one electrode disposed at or adjacent the level of the bottom of the kiln. The advantage of this arrangement was discussed above.

Advantageously, there is at least one pair of electrodes disposed at horizontal levels, the vertical spacing between which is over half the depth or the maximum depth of the molten glass in the part of the kiln in which such electrodes are located, and is preferably more than three-quarters of such depth.

Optimally, the apparatus incorporates at least one pair of electrodes, one of which is located at or adjacent the bottom of the kiln and the other of which is located at or adjacent the surface level of the molten glass.

The electrical system of the apparatus preferably incorporates at least one electrode which forms part of, or is disposed on, the sole of the kiln. This placing of the lower electrode assists in reducing flow retardation of horizontal currents at the bottom of the kiln and in keeping the glass in that region at a higher temperature. This in turn helps to prevent the formation of grains of devitrified glass which may become entrained into the currents feeding the ribbon.

In certain very advantageous embodiments of apparatus according to the invention, there are electrodes located at or near the top and bottom levels of a part of the kiln from which molten glass feeds the ribbon. A layer of molten glass feeding the ribbon is then influenced by the electric current over the full depth of such layer. In a deep bath process such as the classic Pittsburgh process, in which the ribbon is fed by molten glass flowing from the upper part of the kiln, it is accordingly of particular value to provide a pair of electrodes including a lower electrode which is disposed at or near the lowest level of the stream feeding the ribbon, i.e. at the lower level of such upper part of the kiln.

Importance is attached to embodiments of the apparatus in which the electrodes of a pair are at different horizontal levels, at least the upper electrode of such pair being located at a position which, in a plan view of the kiln, is directly to the rear, i.e. downstream, of the drawing zone. Such an electrode arrangement serves to accelerate the flow of glass into the rear side of the ribbon over the main central part of its width.

In apparatus having an upper electrode located directly rearwardly of the drawing zone, the cooperating lower electrode is preferably also disposed at a position which, in a plan view of the kiln, is located rearwardly of the drawing zone. The placing of electrodes so that the general direction of the electric current path between them is substantially vertical and located directly rearwardly of the drawing zone is of particular importance because the electric current between the electrodes will assist in stabilizing the position and shape of the meniscus and in reducing or eliminating certain defects which tend to occur in the glass ribbon, such as variations in the thickness of the ribbon across its width, for example.

Apparatus according to the invention advantageously incorporates at least one pair of electrodes situated at different horizontal levels within the kiln, at least the upper electrode of this pair being located at a side region of the kiln along which glass currents flow towards one edge of the ribbon. When an electric current is passed through the glass in the kiln between such pair of electrodes, theg lass current flowing along such wall is accelerated, which effects has the advantage of increasing the maximum permissible drawing speed. Heat is dissipated directly into the molten glass so that there is less risk of increasing corrosion of the side wall than if heat were applied directly to the wall for transmission to the molten glass.

Preferably the lower electrode of the pair is situated substantially directly below the upper electrode so that the electric current path is substantially vertical, which is desirable for optimum stability of the current of molten glass.

In apparatus composed of a pair of electrodes, of which the upper electrode is in or adjacent a side wall of the kiln as above referred to, the upper electrode is preferably situated in the vicinity of an end of the drawing zone, where molten glass feeds a lateral edge of the ribbon. The placing of the electrodes so that the current between them directly influences the streams of molten glass feeding an edge of the ribbon has a stabilizing effect on the location and form of those streams. In consequence, such arrangement helps in reducing the width of the marginal portion which has to be cut from the ribbon and discarded due to excess thickness of the glass at that margin.

Two or more electrode arrangements of the type described can be combined in a single apparatus. Thus there may be two or more pairs of electrodes located at different positions in the kiln in relation to the drawing zone. According to a particularly advantageous embodiment, the electrode system includes upper electrodes located in the vicinity of respective opposite side walls of the kiln and in the vicinity of respective opposite ends of the drawing zone. Electric currents can then be maintained through molten glass flowing into the edges of the ribbon and the electric currents can be controlled to balance such flows of molten glass.

A very satisfactory arrangement is one in which upper electrodes are situated at side regions of the kiln both in front of and behind a transverse vertical plane containing the bottom of the glass ribbon. With such an arrangement it is possible to balance the flow of glass feeding the edge portions of the ribbon from regions in front of and behind the drawing zone.

There are advantages in locating at least an upper electrode actually against a wall of the kiln. Where an electrode is so located, the glass in contact with the kiln wall becomes heated and this further helps to prevent the formation of devitrified grains due to the presence of relatively cool stagnant zones within the molten glass mass adjacent such wall.

The, or at least one, upper electrode may be incorporated in a wall of the kiln. An upper electrode incorporated in a wall of the kiln may be located so that it is totally submerged in the molten glass in the kiln, or an upper part of the electrode may project above the level of such molten glass, provided the projecting part is not exposed to an atmosphere which severely corrodes the electrode. Such an electrode can have a long life since such corrosion can be minimal, although some corrosion of the electrode where it is in contact with the molten glass is inevitable.

Although there are advantages to be gained from placing an upper electrode against or in a wall of the kiln, as above referred to, advantages are also to be gained by placing said upper electrode at a position spaced inwardly from the adjacent kiln wall. An electrode so located may be in the form of a plate or a molded body of electrically conductive refractory material.

The electrode may be completely immersed in the molten glass, or an upper part of the electrode may be above the molten glass surface, provided such upper part is not exposed to a severely corrosive atmosphere.

By locating an upper electrode at a position spaced inwardly from the adjacent kiln wall, several advantages can be achieved. Firstly, the heating action can be brought closer to the drawing zone so that the energy consumption for producing a given effect on the flow of glass at that zone is reduced. Secondly, the rate of flow of molten glass against the kiln wall at the molten glass surface level is reduced so that corrosion of the refractory wall is reduced. In addition, such an electrode placing helps to prevent flow into the drawing zone of any corroded refractory grains which do form and which loosen from such kiln wall.

Preferably, the, or an upper, electrode is shaped to achieve a predetermined electrical current density distribution, taking into account the temperature and other conditions at the region wherein the electrode is located. The, or an, upper electrode may, for example, be in the form of a plate. The electric current distribution may be such as to achieve intense heating at selected locations, e.g. to prevent devitrification from occurring. Alternatively the upper electrode may be in such form as to achieve an electric current density distribution which is as uniform as possible. If the electric current density is too high there is a risk of bubble formation in the molten glass mass and the effective surface areas of the electrodes are chosen to avoid that situation.

BRIEF DESCRIPTION OF THE DRAWINGS

FIG. 5 is an elevational cross-sectional view of a further Colburn-type plant incorporating a further embodiment of the invention.

FIGS. 6 and 7 are elevational views showing two different forms of electrodes which may be used in carrying out the invention.

FIG. 8 is an elevational cross-sectional view of part of another Colburn-type plant incorporating another embodiment of the invention.

DESCRIPTION OF THE PREFERRED EMBODIMENTS

Figure 1:
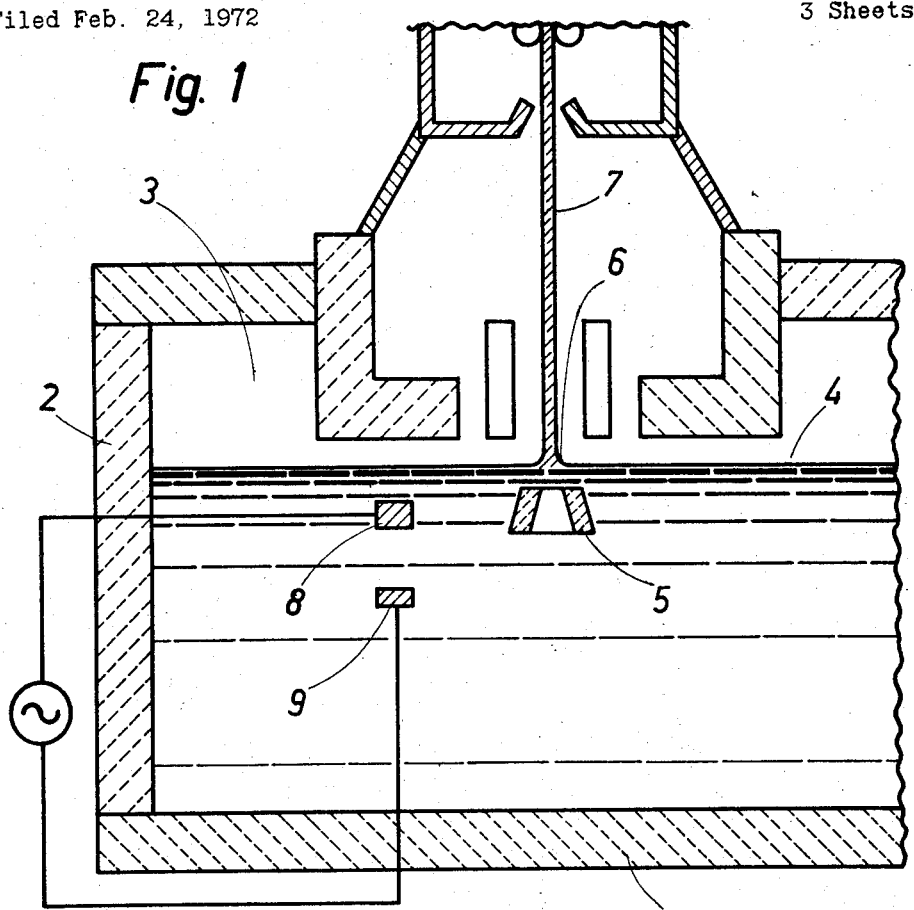
FIG. 1 is an elevational cross-sectional view of part of a Pittsburgh-type glass drawing plant incorporating an embodiment of the invention.

The apparatus of FIG. 1 includes a deep kiln, or tank, having a sole 1, a rear, or cul-de-sac, wall 2 and side walls 3, only one of which is visible in the drawing. This kiln holds a bath 4 of molten glass. A drawbar 5 is submerged in the bath of molten glass directly beneath the location of the meniscus 6 formed at the surface of the bath of molten glass, the meniscus being the region from which a continuous ribbon 7 of glass is drawn upwardly.

Within the molten glass bath, at a position spaced rearwardly, i.e. downstream, from the vertical plane of the ribbon 7 and spaced forwardly, i.e. upstream, from the rear wall 2 of the kiln, there are upper and lower electrodes 8 and 9, respectively, which are connected to a source of alternating current. During the drawing of the glass an electric current is maintained between the electrodes.

It will be noted that both electrodes are located in an upper part of the molten glass bath. They are in fact at levels corresponding to the top and bottom levels, respectively, of the forward flow of molten glass, at the location in the kiln where such forward flow rises to enter the rear, or downstream, side of the ribbon. The electrodes can for example extend over the greater part of the width of the kiln and are preferably substantially coextensive, in that direction, with the width of the ribbon.

By the action of the electric current between the electrodes the flow of molten glass upwardly and into the rear side of the ribbon is promoted. In consequence the maximum drawing speed is considerably increased. For example, the speed of drawing of a ribbon of glass 4 mm. in thickness could be increased from 55 meters per hour to 95 meters per hour. The electrode 8 may consist of tin oxide and the electrode 9 may be formed of molybdenum. These electrode materials are mentioned only by way of example. As an alternative, the electrode 7 and/or the electrode 8 could be made of platinum.

One used an electric current of 30 volts, with a density of current of 0.15 amp/square centimeter and a power of 50 kwatts. Frequencies of 50 and 60 cycles/sec. were used with an equal success.

Figure 2:
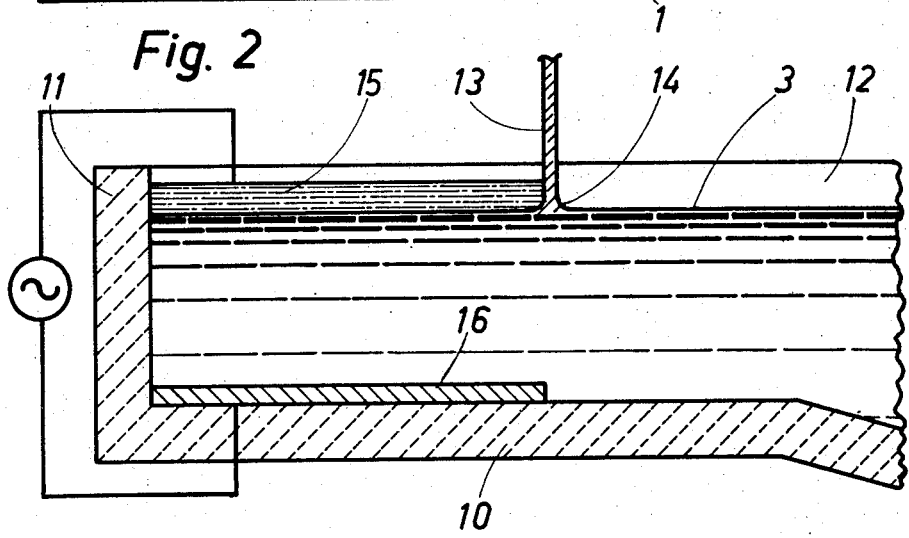
FIG. 2 is an elevational cross-sectional view of part of a Colburn-type glass drawing plant incorporating an embodiment of the invention.

The plant shown in FIG. 2 is composed of a shallow kiln, or pot, having a sole 10, a rear end wall 11 and side walls 12, only one of which is visible in the drawing. The kiln holds a bath of molten glass from the surface of which molten glass is drawn as a continuous ribbon 13 via a meniscus 14 which is formed at the surface. The glass ribbon 13 is drawn upwardly through a vertical annealing lehr (not shown). As an alternative, the ribbon could be conducted over a bending roller and through a horizontal lehr.

Two electrodes 15 and 16 are provided one above the other in the region of the kiln which is to the rear of the drawn glass ribbon. The upper electrode 15 consists of a layer of electrically conductive molten material which floats on the surface of the bath between the meniscus 14 and the rear end wall 11 of the kiln. In the embodiment which is the subject of the drawing, the upper electrode is constituted by a quantity of molten $MgCl_2$. As an alternative, the upper electrode could be formed of some other electrically conductive molten metal salt of lower specific gravity than the molten glass, or of a molten metal or a molten metal alloy. The molten material forming the upper electrode occupies the whole area defined by the rear end and side walls 11, 12 of the kiln and the ribbon.

The molten material of the electrode 15 is prevented from flowing around the lateral edges of the ribbon in the vicinity of the meniscus by means of a graphite body vertically U-shaped so that the lateral edge of the ribbon can ascend when sliding into the U-shape. The graphite body is porous and is internally fed by gas which burns when reaching the surface of the body, protecting this body against oxidation.

The lower electrode 16 is a plate made of platinum or some other electrically conductive material and is disposed on the sole 10 of the kiln.

The electrodes 15 and 16 are connected to the terminals of an alternating current source. Of course, a direct current source could also be used.

The current of molten glass which flows beneath the drawing one toward the rear end wall and which rises preparatory to flowing into the rear side of the ribbon is heated by the electric current flowing between the electrodes 15 and 16. The flow of glass into the rear side of the ribbon is therefore promoted, enabling a ribbon of particularly good quality in regard to its surface and optical properties to be produced. Moreover a ribbon of a given quality can be drawn at a faster rate than has hitherto been possible.

The large area of the electrodes 15 and 16 allows the current density in the vicinity of the electrodes to be kept at a value of less than 0.5 amper per square cm., at which low value there is little or no risk of the formation of bubbles which would become entrained into the ribbon of glass. Should the liquid electrode 15 become contaminated it can easily be replaced without interrupting the sheet glass production. The thickness of this electrode can also be varied while drawing of glass proceeds.

One used an electric current of only 5 volts in order to reduce the chemical reactions between the molten material and the molten glass. The density of current was 0.05 amp/square centimeter and the electric power only reached 7 kwatts.

Figure 3:
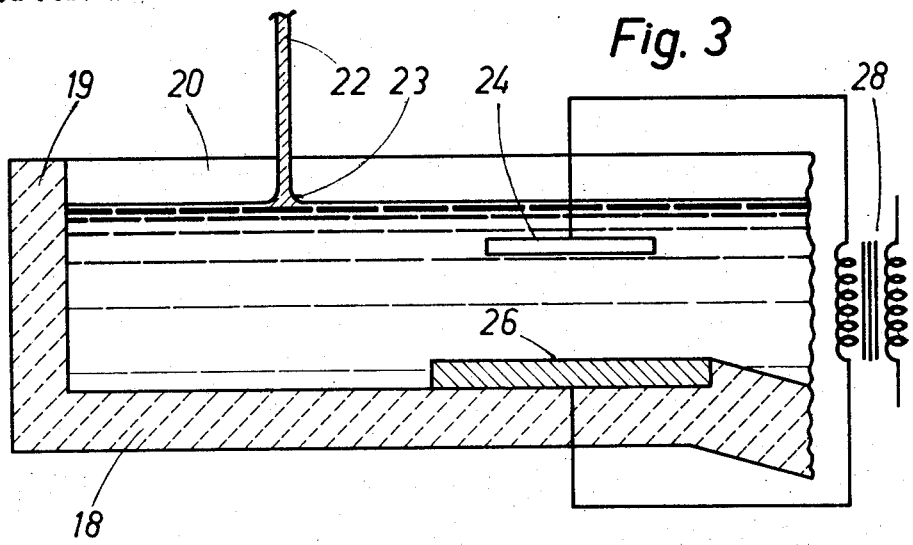
FIG. 3 is a view similar to that of FIG. 2 of part of another Colburn-type plant incorporating an embodiment of the invention.
Figure 4:
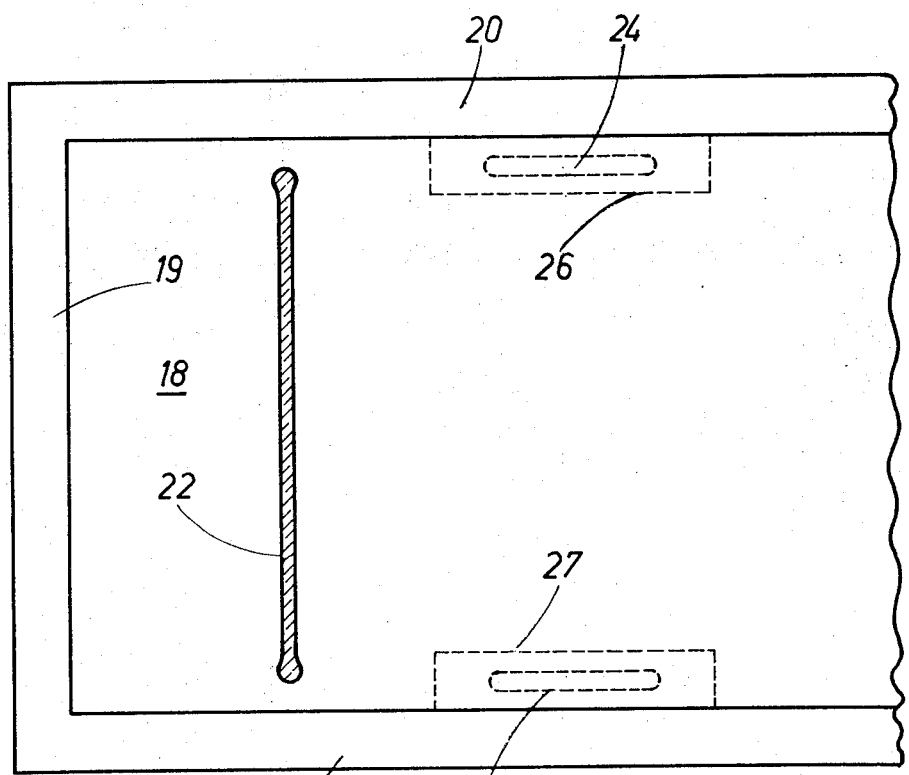
FIG. 4 is a plan view of the part of the plant shown in FIG. 3.

Referring now to FIGS. 3 and 4, there is shown an apparatus composed of a shallow kiln, or pot, having a sole 18, a rear end wall 19 and side walls 20 and 21. Upper and lower electrodes are located in the bath of molten glass at a position in front of, i.e. upstream of the drawing zone at which glass is drawn upwardly as a continuous ribbon 22, via a meniscus 23 formed at the surface of the molten glass bath.

There are two upper electrodes 24 and 25 located a small distance beneath the surface of the molten glass bath, and at locations near to the opposite side walls 20 and 21, respectively, of the kiln, and two lower electrodes 26 and 27 which are located on the sole 18 and beneath the upper electrodes 24 and 25, respectively.

The electrodes 24, 25, 26 and 27 are preferably solid electrodes and are connected to a source of alternating current via a transformer 28, the output voltage from which is sufficient to maintain the desired alternating electric current level through the bath of molten glass, between the electrodes 24 and 26, on the one hand, and between the electrodes 25 and 27, on the other hand.

Thus the resulting electric currents keep the molten glass which is in the vicinity of the side walls 20 and 21, and which is flowing toward the end regions of the drawing zone, in a more fluid state so that there is little or no disparity in the rate of flow of molten glass from one region to another across the width of the kiln. In consequence, the drawing speed can be higher than in conventional apparatus. By using electric heating currents as described while drawing a ribbon of glass 2 mm. in thickness, it was found to be possible to increase the drawing speed from 100 meters per hour to about 140 meters per hour.

The source of A.C. was comprised in the range of 10 to 25 volts, preferably 20 volts with a density of current of 0.4 amp/square centimeter, whereby no formation of bubbles was noticeable. Due to this electric current, the temperature at the location of the electrodes was increased by 40° C.

FIG. 5 shows a Libbey-Owens type drawing plant composed of a shallow kiln having a sole 29, a rear end wall 30 and side walls 31, only one of which is visible in the drawing. Molten glass is fed into the kiln and flows continuously along the kiln in a direction towards the rear end wall 30.

At a location spaced forwardly from the rear end wall 30, molten glass is drawn upwardly from the surface of the molten glass in the kiln as a continuous ribbon 32, via a meniscus 33. The ribbon travels over a bending roller 34 and travels therefrom in a substantially horizontal direction through an annealing lehr (not shown).

At a location which is to the rear of the drawing zone, i.e. at the opposite side of the ribbon 32 from the glass feed end of the apparatus, there is a pair of electrodes 35 and 36 which extend over the greater part of the projected width of the ribbon, and at a position in front of the drawing zone there are further electrodes.

These further electrodes include two upper electrodes and a single lower electrode. The upper electrodes are located a short distance beneath the surface of the molten glass bath and at or near the opposed side walls 31 of the kiln. Only one of these upper electrodes, electrode 37, is visible in the drawing. The lower electrode 38 is located in the sole 29 of the kiln and extends over the greater part of its width.

The upper electrodes 35 and 37 are solid electrodes. For example such upper electrodes may be tungsten plates. The lower electrodes 36 and 38 are formed by quantities of electrically conductive molten material, for example molten tin. The electrodes 35 and 36 are connected to an alternating current source 39. The electrodes 37 and 38 are connected to another alternating current source (not shown).

The electric currents passing through the molten glass in front of the drawing zone, between the electrodes 37 and 38, maintain the molten glass flowing adjacent the side wall of the kiln in a satisfactory fluid condition, whereas the electric current passing between the electrodes 35 and 36 heats the molten glass current which rises behind the drawing zone and feeds the rear side of the ribbon.

The current densities in the vicinity of the electrodes in the apparatus shown in FIG. 5 will preferably be restricted to 0.5 ampere per square cm. to minimize the risk of bubble formation at the electrodes and thus the consequent risk of impairing the optical quality of the glass. The maintenance of the heating currents at the side regions of the kiln, in front of the drawing zone, and in the portion of the kiln behind the drawing zone, promotes the attainment of a uniform speed of flow, firstly as between the masses of glass in front of and behind the drawing zone, and secondly as between the masses of glass feeding into the central part of the ribbon on the one hand and the margins of the ribbon on the other. By adopting the electrode system described, it was found possible to increase the drawing speed of a ribbon of glass 2 mm. in thickness from 120 meters per hour to about 190 meters per hour.

One used an A.C. source of 20 volts between electrodes 35 and 36 with a density of current of 0.2 amp/source centimeter. The frequency was 50 cycles/sec.

FIG. 6 and 7 show alternative embodiments of electrodes which may be used in any process or apparatus according to the invention. The electrode shown in FIG. 6 is of arcuate profile whereas the electrode shown in FIG. 7 has a flat profile with a beaded upper edge. FIGS. 6 and 7 are merely illustrative of different forms of electrode which can be selected in order to limit the electric current density and/or to achieve a very uniform electric current density distribution, and the current density can be made sufficiently low to avoid the formation of gas bubbles. The forms and dispositions of the electrodes shown in FIGS. 6 and 7 further assist in preventing the formation of devitrified material along the adjacent wall of the kiln, which may be an end or a side wall, or in any case in reducing the entrainment of any devitrified material towards the drawing zone.

FIG. 8 shows part of a shallow bath type plant incorporating a shallow kiln having a sole 42, a rear end wall 43 and side walls 44, only one of which is visible in the drawing. Molten glass is drawn from the surface of the molten glass bath in the kiln in the form of a continuous ribbon 45 via a meniscus 46 and the ribbon passes around a bending roller 47 so as to continue along a substantially horizontal path. As an alternative, the ribbon could be drawn upwardly through a vertical annealing lehr.

Electric current is passed through molten glass in the kiln between an upper electrode 48 and a lower electrode 49. The electrode 48 is constituted by a plate of electrically conductive material. The lower electrode is constituted by a quantity of electrically conductive molten material held in a recess in the sole 42 and extending across the entire width of the kiln from a position in front of the drawing zone up to the rear end wall 43. The presence of this molten material imposes a very low frictional restraint on the flow of molten glass along the bottom of the kiln. If desired, further upper electrodes could be provided near the surface level of the molten glass in the kiln, at or adjacent the side walls of the kiln, at positions in front of and/or behind the drawing zone.

If, in addition, upper electrodes are provided adjacent the end regions of the drawing zone, the drawing speed in the case of a ribbon 4 mm. in thickness may be as much as 100 meters per hour or even higher. Even when drawing glass of that thickness at that high drawing speed, a perfect stablity of the meniscus, with regard to its shape and position at the surface of the bath, is achieved.

One used an electric current of 25 volts with a density of current of about 0.3 amp/square centimeter and a frequency of 60 cycles/sec. There was no formation of bubbles in the glass. The power needed was 70 kwatts. When increasing the density of current to 0.5 amp/square centimeter there was formation of some gas bubbles at the locations of the electrodes.

In the various examples given hereabove, the electrodes, if solid, are directly laid on the bottom of the furnace and preferably held in place by the rigid and well known supports of the terminations of the electric connecting cables. If they are located above the bottom of the furnace, the electrodes will preferably be anchored, by their extremities, in the vertical walls of the drawing chamber, or they will be supported by brackets anchored in these walls.

It will be understood that the above description of the present invention is susceptible to various modification, changes and adaptations, and the same are intended to be comprehended within the meaning and range of equivalents of the appended claims.

What is claimed is:

1. In a process of manufacturing sheet glass by continuously feeding molten glass into a kiln having a sole, a rear end wall and side walls, and continuously drawing a ribbon of glass upwardly from a drawing meniscus formed at the free surface of the glass in the kiln and supplied by glass surface currents, the improvement comprising: locally heating the glass currents in the kiln across substantially the entire width of the ribbon by disposing a pair of conductive electrodes at respectively different levels in at least one portion of the kiln, and extending across substantially the entire width of the ribbon at the side of the ribbon directed toward the rear end wall, and passing an electric current through the molten glass between the electrodes for promoting the flow of molten glass into the glass surface currents supplying the drawing meniscus at the free surface of the glass in order to improve the uniformity between such glass currents feeding the two sides of the ribbon.

2. A process as defined in claim 1 wherein the electrodes are disposed so that the mean direction of the electric current between them is at an angle of at least 45° to the horizontal.

3. A process as defined in claim 2 wherein the electrodes are disposed so that the shortest path between them is substantially vertical.

4. A process as defined in claim 1 wherein the lower electrode of the pair is disposed in the vicinity of the bottom of the kiln.

5. A process as defined in claim 4 wherein the electrodes are located in a portion of the kiln from which molten glass feeds the ribbon.

6. A process as defined in claim 1 wherein the vertical spacing between the electrodes is at least three-quarters of the maximum depth of the molten glass in the part of the kiln in which such electrodes are located.

7. A process as dfined in claim 1 wherein the lower electrode of the pair is located in the vicinity of the bottom of the kiln and the upper electrode of the pair is located in the vicinity of the surface level of the molten glass in the kiln.

8. A process as defined in claim 1 wherein the lower electrode of the pair rests directly on the sole of the kiln.

9. A process as defined in claim 8 wherein the lower electrode of the pair is composed of a quantity of molten metal or molten metal salt.

10. A process as defined in claim 1 wherein the kiln is a deep kiln, the molten glass flowing into the ribbon is derived essentially from an upper part of the mass of glass in the kiln, and the lower electrode of the pair is disposed in the vicinity of the lower boundary of such upper part.

11. A process as defined in claim 1 wherein the electrodes are located between the glass ribbon and the end wall of the kiln.

12. A process as defined in claim 11 wherein the upper electrode of the pair is spaced from the end wall of the kiln.

13. A process as defined in claim 1 wherein the electrodes are disposed adjacent a side wall of the kiln.

14. A process as defined in claim 13 wherein the electrodes are located in the vicinity of an end of the meniscus via which glass enters a lateral edge of the ribbon.

15. A process as defined in claim 13 wherein there are electrodes disposed for passing electric current through molten glass located adjacent both side walls of the kiln.

16. In apparatus for drawing sheet glass and including a kiln having a feed end via which the kiln is continuously fed with molten glass, the kiln also having a rear end wall opposite the feed end, side walls extending between the feed end and the rear end wall, and a sole, and means for continuously drawing a ribbon of glass upwardly from a drawing meniscus formed at the free surface of the glass in the kiln and supplied by glass surface currents, the improvement comprising means extending across substantially the entire width of the ribbon between the ribbon and said rear end wall for locally heating the glass in the kiln by means of an electric current through the glass, said means being disposed in said kiln for passing such electric current through molten glass in at least one part of the kiln where molten glass currents flow towards the rear surface of the ribbon, said means comprising at least one pair of electrodes located at different levels in the kiln.

17. An arrangement as defined in claim 16 wherein said electrodes are disposed so that the mean direction of the electric current path between them is at an angle of more than 45° to the horizontal.

18. An arrangement as defined in claim 17 wherein said electrodes are disposed so that the shortest path between them is substantially vertical.

19. An arrangement as defined in claim 16 wherein at least one of said electrodes is composed of a molten metal.

20. An arrangement as defined in claim 16 wherein at least one of said electrodes is made of a solid material.

21. An arrangement as defined in claim 20 wherein said at least one of said electrodes is made of a solid material selected from the group consisting of: refractory noble metals, graphite, molybdenum, $SnO_2$, and other electrically conductive refractory oxides.

22. An arrangement as defined in claim 16 wherein at least one of said electrodes is composed of an electrically conductive molten metal salt.

23. An arrangement as defined in claim 16 wherein at least one of said electrodes is disposed in the vicinity of the bottom of said kiln.

24. An arrangement as defined in claim 16 wherein the vertical spacing between said electrodes is at least three quarters of the maximum depth of the molten glass in the part of the kiln in which such electrodes are located.

25. An arrangement as defined in claim 16 wherein one of said electrodes is disposed in the vicinity of the bottom of said kiln and the other of said electrodes is located in the vicinity of the surface of the molten glass in said kiln.

26. An arrangement as defined in claim 16 wherein one of said electrodes lies directly on said sole of said kiln.

27. An arrangement as defined in claim 16 wherein said electrodes are located in the vicinity of the top and bottom levels, respectively, of a part of said kiln from which molten glass feeds the ribbon.

28. An arrangement as defined in claim 16 wherein said kiln holds a quantity of molten glass, the ribbon is drawn from molten glass in an upper part of said kiln, and the lower electrode of said pair is disposed in the vicinity of the lower boundary of such upper part of said kiln.

29. An arrangement as defined in claim 16 wherein at least the upper electrode of said pair is located between the ribbon and said rear end wall directly adjacent the base of the ribbon.

30. An arrangement as defined in claim 29 wherein both electrodes are located directly adjacent the base of the ribbon between the ribbon and said end wall of said kiln.

31. An arrangement as defined in claim 16 wherein at least the upper electrode of said pair is located at a side region of said kiln along which glass currents flow towards a lateral edge of the ribbon.

32. An arrangement as defined in claim 31 wherein both electrodes of said pair are located at a said side region of said kiln.

33. An arrangement as defined in claim 31 wherein the upper electrode of said pair is situated in the vicinity of a side of the drawing zone where molten glass feeds into a lateral edge of the ribbon.

34. An arrangement as defined in claim 16 wherein there are several pairs of said electrodes, including two upper electrodes disposed at one side of the vertical plane along which the ribbon extends and each adjacent a respective side wall of said kiln, and two upper electrodes disposed at the other side of the vertical plane along which the ribbon extends and each adjacent a respective side wall of said kiln.

35. An arrangement as defined in claim 16 wherein at least the upper electrode of said pair is located against one said wall of said kiln.

36. An arrangement as defined in claim 16 wherein at least the upper electrode of said pair is disposed in one said wall of said kiln.

37. An arrangement as defined in claim 16 wherein at least the upper electrode of said pair is disposed adjacent, and spaced inwardly from, one said wall of said kiln.

38. An arrangement as defined in claim 16 wherein at least the upper electrode of said pair is shaped to produce a predetermined electric current density distribution.

39. Sheet glass manufactured by a drawing process as defined in claim 1.

References Cited
UNITED STATES PATENTS

| | | | |
|---|---|---|---|
| 2,274,986 | 3/1942 | Kilian et al. | 65—337 UX |
| 2,236,231 | 3/1941 | Borel | 65—203 X |
| 2,111,860 | 3/1938 | Kilian | 65—203 X |
| 1,598,765 | 9/1926 | Fox et al. | 65—203 X |
| 3,692,510 | 9/1972 | Goldberg et al. | 65—203 |
| 3,251,669 | 5/1966 | Dunipace et al. | 65—203 X |

ARTHUR D. KELLOGG, Primary Examiner

U.S. Cl. X.R.
65—40, 203, 337, 90